*(12)* United States Patent
Marchal

(10) Patent No.: US 10,364,502 B2
(45) Date of Patent: Jul. 30, 2019

(54) COMPOSITE HARDWARE FOR AN ELECTROCHEMICAL CELL

(71) Applicant: ITM Power (Research) Limited, Sheffield, South Yorkshire (GB)

(72) Inventor: Frederic Andre Marchal, Sheffield (GB)

(73) Assignee: ITM POWER (RESEARCH) LIMITED, Sheffield, South Yorkshire (GB)

( * ) Notice: Subject to any disclaimer, the term of this patent is extended or adjusted under 35 U.S.C. 154(b) by 0 days.

(21) Appl. No.: 14/905,662

(22) PCT Filed: Jul. 11, 2014

(86) PCT No.: PCT/GB2014/052133
§ 371 (c)(1),
(2) Date: Jan. 15, 2016

(87) PCT Pub. No.: WO2015/008043
PCT Pub. Date: Jan. 22, 2015

(65) Prior Publication Data
US 2016/0160363 A1    Jun. 9, 2016

(30) Foreign Application Priority Data

Jul. 17, 2013 (GB) .................................. 1312803.8

(51) Int. Cl.
*C25B 9/12* (2006.01)
*C25B 9/06* (2006.01)
(Continued)

(52) U.S. Cl.
CPC .................. *C25B 9/08* (2013.01); *B32B 1/08* (2013.01); *B32B 3/266* (2013.01); *B32B 3/30* (2013.01);
(Continued)

(58) Field of Classification Search
CPC ..... C25B 9/06; C25B 9/08; C25B 9/12; B32B 2262/106; B32B 27/288
(Continued)

(56) References Cited

U.S. PATENT DOCUMENTS 4,253,932 A    3/1981  Mose et al.
2009/0294283 A1   12/2009  Norman et al.

FOREIGN PATENT DOCUMENTS

CH    683104    1/1994
DE  10243405    4/2004
(Continued)

OTHER PUBLICATIONS

International Search Report/Written Opinion, International Application No. PCT/GB2014/052133, PCT/ISA/210, PCT/ISA/237, dated Oct. 1, 2014.
(Continued)

*Primary Examiner* — Zulmariam Mendez
(74) *Attorney, Agent, or Firm* — Saliwanchik, Lloyd & Eisenschenk

(57) ABSTRACT

A composite cell plate can include a polymer element laterally mated and interlocked, at a plurality of engagement points, with a resilient metal element. The cell plate can be used in an electrochemical cell. A method of forming a cell plate can include fitting a polymer element to a resilient metal element at a plurality of engagement points, and expanding the polymer of the polymer element such that the polymer element and the resilient metal element engage and interlock at the engagement points.

13 Claims, 1 Drawing Sheet

(51) Int. Cl.
    *C25B 9/08*     (2006.01)
    *B32B 15/08*     (2006.01)
    *B32B 27/18*     (2006.01)
    *B32B 27/28*     (2006.01)
    *B32B 1/08*     (2006.01)
    *B32B 3/26*     (2006.01)
    *B32B 3/30*     (2006.01)
    *C25B 9/00*     (2006.01)
    *C25B 9/20*     (2006.01)
    *H01M 8/0206*     (2016.01)
    *H01M 8/0221*     (2016.01)
    *H01M 8/0228*     (2016.01)
    *H01M 8/0276*     (2016.01)

(52) U.S. Cl.
    CPC .............. *B32B 15/08* (2013.01); *B32B 27/18* (2013.01); *B32B 27/285* (2013.01); *B32B 27/288* (2013.01); *C25B 9/00* (2013.01); *C25B 9/20* (2013.01); *H01M 8/0206* (2013.01); *H01M 8/0221* (2013.01); *H01M 8/0228* (2013.01); *H01M 8/0278* (2013.01); *B32B 2262/106* (2013.01)

(58) Field of Classification Search
    USPC ........................................................ 204/242
    See application file for complete search history.

(56) References Cited

FOREIGN PATENT DOCUMENTS

| | | |
|---|---|---|
| EP | 1225032 | 7/2002 |
| GB | 2037813 | 7/1980 |
| JP | 2008-16361 | 1/2008 |
| JP | 2008-27761 | 2/2008 |
| WO | 0138063 | 5/2001 |
| WO | 2011128705 | 10/2011 |

OTHER PUBLICATIONS

Notice of Reasons for Rejection, Japanese Patent Application No. 2016-526693, dated Jun. 13, 2018.

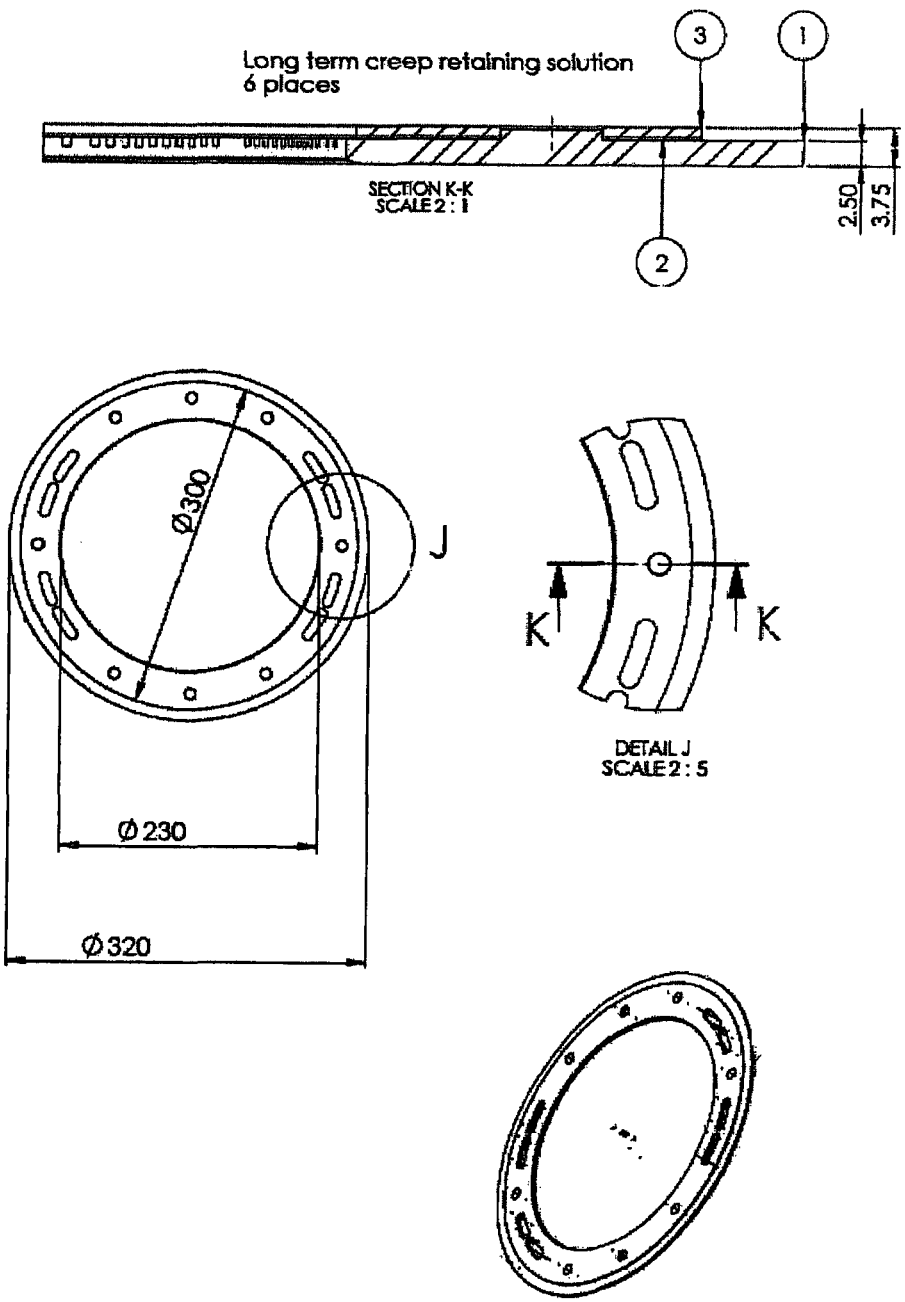

COMPOSITE HARDWARE FOR AN ELECTROCHEMICAL CELL

CROSS-REFERENCE TO RELATED APPLICATIONS

This application is a national stage application of International Patent Application No. PCT/GB2014/052133, filed Jul. 11, 2014, which claims priority to United Kingdom Application Number 1312803.8, filed Jul. 17, 2013, the disclosures of each of which are incorporated herein by reference in their entirety, including any figures, tables, and drawings.

FIELD OF THE INVENTION

The present invention relates to electrochemical cell hardware.

BACKGROUND OF THE INVENTION

Electrolyser cell hardware comprising only a polymer presents difficulties in pressure retention, dimensional stability, and resistance to hoop stress. It is desirable to operate an electrolyser at high pressures, self-pressurising it using the proton pump effect to save energy in compression to the product gas. Typically, the pressure associated with thresholds enabling a reduction in the number of compressor stages and associated costs are 15, 30, 80 bar gauge.

At 15 bar and 60° C., for a given electrolyser cell made from polymer alone, having an internal diameter of 230 mm and an outer diameter of 320 mm, with a Polyphenylene Sulphide (PPS) glass-filled material, the average hoop stresses would be in the region of 4.3 MPa. This is easily calculated with the hoop stress formula, known to those familiar with the art.

$$\sigma = \left(\frac{d}{2t}\right) P_{eff} \quad (1)$$

σ: hoop stress
d: mean diameter=275mm
t: ring wall thickness=45mm
Peff: effective pressure Peff=$P_{internal}-P_{atm}$=1.5-0.1=1.4 MPa $$\sigma = \left(\frac{275}{90}\right) 1.4 = 4.3 \text{ MPa} \quad (2)$$

200 MPa is the ultimate strength of the material envisaged in the preferred embodiment (Polyphenylene Sulphide). High-pressure electrolysers are not expected to retain pressure continuously. Depending on the percentage utilisation and cyclic energy input profile (often a renewable energy input), the electrolyser will be subjected to a corresponding cyclic loading. It will very slowly depressurise after gas generation is stopped, whilst accumulated gas in adjoining store will be prevented from flowing back using non-return and pressure control valves.

Therefore to test a cell assembly according to these high-pressure conditions, a test consisting of a series of pressure cycles from 0 to a pressure including a factor of safety should be carried out. The test pressure should be 1.43 times the value of the relief pressure setting, typically set at 18 bar for 15 bar working pressure. Therefore the pressure the cell is subjected to is 26 bar G; this would qualify a pressure retention assembly to 15 bar working pressure. 5000 cycles correspond to approximately 4.5 years running, assuming 3 full pressure cycles per day. At 15 bar the stress levels are modest with respect to the geometry and materials considered.

Since higher pressures are desirable (30 and 80 bar), the above calculation example shows that it is imperative to strengthen the parts. This poses greater challenges.

One construction commonly encountered is a full steel ring construction. This is expensive when stainless is used, if stainless steel can be used. If titanium has to be used instead, it is prohibitive.

An alternative to the latter is a secondary containment vessel used as an external pressure jacket, to counter act hoop stresses from the outside. This is satisfactory for discrete installation (research tools), but industrially, it is not conducive to manufacturability, nor is cost effective.

It may also be possible to apply a significant axial load on the faces of the cell plate to increase its stiffness matrix. This has little to no effect to counter the action resulting from internal pressure since the load directions are not opposing each other. Replacing the polymer by another tougher polymer is done invariably at the expense of elongation; the latter being important to prevent catastrophic fracture. Elongation is itself negative as it affects the membrane to cell internal diameter fit.

SUMMARY OF THE INVENTION

A number of solutions were tested to try to reduce hoop stress in a polymer electrochemical cell. A steel only solution (i.e. a full cell plate made from steel) resulted in a prohibitive increase in cost and weight due to the intricacy of flow channels having to be machined. It also excludes injection-molding as a mass manufacturing process to serve the roll out of the hydrogen economy. Integral steel inserts to an injection-moulded polymer were also tested, and were unsuccessful. They were very difficult to implement due to them being nested within a very thin wall of polymer. This leads to a conflicting set of objectives of making the part thin, on the one hand and the reinforcement bigger on the other. Differential expansion rates and cooling rate add defects to the already complex molding process. This is impractical.

External rivets joining the cell plate and the polymer cell plate were also envisaged but they add a considerable amount of parts and make the assembly process more complicated.

None of those solutions are practical for large volume production and cost effectiveness in what concerns the most repetitive hardware unit of the so called hydrogen economy.

With the above solutions discounted, it was found that having a resilient metal cell plate laterally interlocked and engaged with a polymer cell plate, resulted in a composite cell plate which was surprisingly resistant to hoop stresses. The results presented herein demonstrate this.

Therefore, according to a first aspect, a composite cell plate comprises a polymer element laterally mated and interlocked, at a plurality of engagement points, with a resilient metal element.

According to a second aspect, an electrochemical cell comprises a membrane electrode assembly positioned between two composite cell plates as described above.

According to a third aspect, a composite cell plate as described above is useful in an electrochemical cell.

According to a fourth aspect, a method of forming a cell plate as described above comprises fitting the polymer element to the metal element at the engagement points, and expanding the polymer such that the polymer element and the metal element engages and interlocks at the engagement points.

Description of the Preferred Embodiments

As used herein, the term "engineering polymer" has its ordinary meaning in the art and is a polymer with exceptional mechanical properties such as stiffness, toughness, and low creep. Examples of engineering polymers are acetals, polyamides, polyimides, polyacrylates, polycarbonates, and polyesters.

The resilient metal element preferably comprises steel. Alternatively, it comprises titanium. It is preferably a substantially flat structure, i.e. two-dimensional. It is preferably circular. More preferably, it is ring-shaped.

The resilient metal element comprises a plurality of apertures, such that it can be mated with a polymer (preferably injection-moulded) element (cell-plate) including a plurality of matching protrusions. Preferably, these protrusions are spigots, more preferably, shear spigots. The protrusions engage with the apertures, interlocking and mating the two parts. The bi-axial loading mode incurred by internal working pressure in the composite cell making up this stack cell assembly is therefore better resisted by a transfer of hoop stresses from the polymer ring to the steel ring and in a manner that minimises the chances of distortion taking place, reduces strain of the polymer to a maximum of that corresponding to the actual steel ring strain.

As used herein, the term "spigot" means a peg or a plug that is integral to the cell plate, preferably the injection moulded cell plate. In a preferred embodiment, a plurality of spigots is positioned along the circumference of the cell plate.

In a preferred embodiment, the protrusion/spigot is made from a polymer. Preferably, the polymer is a technical or engineering polymer, for example, glass-filled plastic (which makes for a very strong set of 'anchor features'). A "technical" or "engineering" polymer is a term that will be understood by the skilled person and refers to a grade of polymer that has above average mechanical properties, i.e. superior to 'commodity' ones. A preffered engineering polymer for use in the invention is polyphenylene sulphide. Another preferred engineering polymer is polyether ether ketone (PEEK).

In a preferred embodiment, the polymer (which is preferably an engineering polymer is filled with carbon fibre. An advantage of PEEK, especially PEEK filled with carbon fibre, is that it enables the composite end-plate to have a higher ultimate tensile strength. It also enables an electrochemical cell incorporating such an end-plate to operate at higher pressures. It can also enable operation at a greater diameter (due to the high tensile strength).

It is believed that carbon fibre additives promote dimensional stability to precision mechanical parts under thermal gradients. Carbon fibre additives have an extremely low coefficient of thermal expansion.

The gap between the internal diameter of a cell comprising a composite plate of the invention and the internal electrode outside diameter of an electrolyser has to kept to a minimum, whilst allowing initial assembly, to prevent extrusion and costly damage to membranes.

The selection of an engineering material as described herein containing a degree of carbon fibre actually stops the gap from growing. It may become smaller as temperature increases with if PEEK reinforced with carbon fibre is used, as it expands less rapidly than the metallic internal electrodes.

In a preferred embodiment, the percentage of carbon fibre in the polymer, which is preferably an engineering polymer e.g. PEEK, is up to 40%. Preferred lower limits are 1, 2, 3, 4, 5, and 10%, and preferred upper limits are 30, 35 and 40%. In one embodiment, the amount of carbon fibre is about 30%.

In a preferred embodiment, the spigot is integral with the cell plate. Preferably, they are both made from the same polymer (e.g. engineering polymer). Preferably, they are injection-moulded.

When those are mated to a tightly fitting metal component containing corresponding "hole" features, the result is an economical, high pressure capable design which also contains all the required features for an electrochemical cell operation.

In a preferred embodiment, the design of the polymer element/cell plate confers a near term structural integrity—when envisaged as a single part—with regards to hoop stresses and the mated metal element provides an additional, long term creep resistance element to it. The two parts are separate and essentially 2-dimensional, so there is simplicity of manufacture and assembly.

In a preferred embodiment, the engagement points are spaced around the circumference of the composite cell plate. Preferably, there are at least 2, 3, 4, 5 or 6 engagement points. Preferably, the polymer element and the metal element are a hollow ring-shape.

In a preferred embodiment, the polymer comprises a plurality of protrusions, which engage and interlock with corresponding apertures in the metal element at the engagement points. Preferably, there is a plurality of apertures, which are either circular or elliptical. More preferably, there is a combination of both circular and elliptical apertures. Preferably, there are at least 2, 3, 4, 5 or 6 corresponding protrusions and apertures.

Preferably, the polymer component is made from polyphenylene sulphide or polyether ether ketone.

The metal element therefore fulfills the role of a long-term strain retainer. It avoids the onset of excessive overall strain in the polymer, and therefore enables the safe use of stiff, low elongation engineering polymers. The polymer formulation and its additives minimize stress relaxation effects on the polymer ring at the spigot location. Additionally, the metal element minimises distortion. In the preferred embodiment of the metal element being ring-shaped, the amount of expensive metal is minimized. Further, the only additional processing is to make apertures in the metal plate, which is not laborious. Several issues associated with injection-moulded cell hardware and materials are therefore addressed in a lean design.

Tests have shown that the adequate tuning of thermal expansion properties of the two mating component up to system operating temperature lead to no distortion taking place.

A finite element analysis indicates that cell hardware capable of a pressure of 80 bar can engineered according to the present invention to yield strain in the polymer that are lower than if left unreinforced and that are therefore conducive to sustain long-term strain in a safe manner. The level of strain achieved is within standards and codes for Glass Reinforced Plastic vessel resins, with typically a factor of safety of 10 on the strain rupture. The said standard and codes of practice are deemed sufficient for resin and glass system subject to unrestrained strain (in other words without a ductile re-enforcement) A number of tests including strain gauging of samples, burst test, and cyclic test have confirmed those predictions.

The cell plate and steel ring may also be interfaced by a flat gasket. The use of gaskets is significant with regards to inherent safety in this pressure system containing potentially a mix of detonative products. Suitable gaskets, for example the materials and sizing of those gaskets, is known to those skilled in the art.

The stack of cells and steel rings is being inherently protected by the fact that the gasket will leak in case of overpressure and, with a finite amount of axial pressure. Therefore, the risk of a catastrophic pressure condition developing is minimal. In a preferred embodiment, a gasket is constructed such that the assembly will leak safely In sharp contrast, O-ring grooves and indeed grooved hardware plate alike will lead to a greater ratcheting of pressure, energy storing, bulging and potentially more catastrophic failure. This is due to progressive deformation of stack and O-ring or sealing media having a tendency to self-seal, resulting in a ratcheting of pressure.

A membrane electrode assembly comprising a composite cell plate according to the invention is inherently safe.

WO2011/128705 (which is incorporated herein by reference) describes a cell stack comprising an electrochemical cell, or a plurality of axially arranged electrochemical cells, with an end plate at each end of the stack, each cell comprising an active area surrounded by a peripheral area, wherein the active area comprises the membrane electrode assembly, and the peripheral area or cell plate includes channels for reactants, and wherein the stack comprises means for applying pressure axially to the active area to contact the membrane and electrodes, and separate means for applying pressure axially to the peripheral area or cell plates. An electrochemical cell made to this specification results in a uniform active area pressure, which can be fine-tuned independently from the sealing force. The present invention can provide an improvement to the cell disclosed in WO2011/128705, since the traditional peripheral area can be replaced by a composite end-plate according to the invention.

A further advantage is the possibility of clipping together two sub-assemblies of 3 components (steel ring, gasket and polymer ring) via the spigots provided to obtain a sub-assembly prior to final assembly of a cell currently comprising 16 elements therefore reducing handling on final assembly by 25%. A considerable reduction for the most repeated element in a water electrolyser. It also ensures a more effective division of labour with lean manufacture in mind. The reduction in components numbers during final assembly is from 16 components down to 12 components.

In a preferred embodiment, the present invention is a composite, technical/engineering polymer and corresponding steel external matrix for a filter press electrolyser cell plate hardware, wherein the two elements are mated and interlocked.

Preferably, a gasket is interposed providing inherent safety.

Preferably, a composite of the invention is formed by a method of expanding a plurality of undersize spigots to insert and mate intimately with a corresponding set of steel ring holes.

The composite of the invention has improvements to susceptibility to stress levels, otherwise unattainable with the unreinforced technical polymer alone. It also has considerable improvement to susceptibility to long term strain of the polymer.

Importantly, a composite of the invention reduces component count on final assembly and allows the development and implementation of an efficient subassembly strategy (shortens assembly time by up to 25%).

The invention will now be described with reference to the accompanying drawings, which show a preferred embodiment of the present invention, i.e. a composite cell plate, which is ring-shaped. Symmetry enables the model to be simplified and only half the ring is represented as a result.

FIG. 1 shows a titanium or steel ring, mostly 2-dimensional, i.e. substantially flat or substantially planar, with a plurality of through-hole features, mated with an injection-moulded cell plate with ultimate tensile stress of 200 MPa, including a plurality of matching shear spigots, interlocking the two parts. The bi-axial loading mode incurred by internal working pressure in the composite cell making up this stack cell assembly is therefore better resisted by a transfer and a conversion of hoop stresses from the polymer ring to the steel ring, and in a manner that minimises the chances of distortion taking place, reducing strain of the polymer to a maximum of that corresponding to the actual titanium or steel ring strain.

The invention will now be illustrated by the following Examples.

EXAMPLE 1

A composite end-plate was constructed in accordance with FIG. 1. The ring stress in the cell plate was around 12-14 MPa. According to the hoop stress formula, the ring-stress when a simple ring-shaped structure is used should be 24 MPa at 80 bar. This proves that the structure of the composite cell plate, having the polymer and metal mated and engaged, reduces hoop-stress and increases the life of an electrochemical cell.

EXAMPLE 2

The composite end-plate of Example 1 underwent a cyclic test of more than 50000 cycles of 0 to 30 bar. There was no failure of the end-plate. This equates to about 19 years of service life, illustrating that an end-plate of the invention is very durable.

The invention claimed is:

1. A composite cell plate comprising a polymer element laterally mated and interlocked, at a plurality of engagement points, with a tightly fitting resilient metal element,
   wherein the cell plate is circular,
   wherein the polymer element is a hollow ring-shape, and
   wherein the polymer element comprises a plurality of protrusions, which engage and interlock with corresponding apertures in the resilient metal element, at the engagement points.

2. The cell plate according to claim 1, wherein the engagement points are spaced around the circumference of the end-plate.

3. The cell plate according to claim 1, wherein the metal element is a hollow ring-shape.

4. The cell plate according to claim 1, wherein the resilient metal element comprises steel, titanium, nickel, or a nickel alloy.

5. The cell plate according to claim 1, wherein a gasket is interposed between the polymer element and the resilient metal element.

6. The cell plate according to claim 1, wherein the protrusions are integral with the polymer element.

7. The cell plate according to claim 1, wherein each protrusion is a polymer spigot.

8. The cell plate according to claim 1, wherein the polymer element comprises an engineering polymer.

9. The cell plate according to claim 8, wherein the engineering polymer comprises polyether ether ketone.

10. The cell plate according to claim 9, wherein the polyether ether ketone is reinforced with carbon fibre.

11. An electrochemical cell comprising a membrane electrode assembly positioned between two composite cell end-plates,
- wherein each composite cell end-plate is a cell plate comprising a polymer element laterally mated and interlocked, at a plurality of engagement points, with a tightly fitting resilient metal element, and
- wherein the polymer element comprises a plurality of protrusions, which engage and interlock with corresponding apertures in the resilient metal element, at the engagement points.

12. A method of forming a cell end-plate the method comprising:
- fitting a polymer element to a tightly fitting resilient metal element at a plurality of engagement points; and
- expanding the polymer of the polymer element such that the polymer element and the resilient metal element engage and interlock at the engagement points,
- wherein the formed cell end-plate is circular,
- wherein the polymer element is a hollow ring-shape,
- wherein the polymer element comprises a plurality of protrusions, which engage and interlock with corresponding apertures in the resilient metal element, at the engagement points.

13. A method of fabricating an electrochemical cell, the method comprising disposing a membrane electrode assembly between two cell end-plates,
- wherein each cell end-plate is a cell plate comprising a polymer element laterally mated and interlocked, at a plurality of engagement points, with a tightly fitting resilient metal element, and
- wherein the polymer element comprises a plurality of protrusions, Which engage and interlock with corresponding apertures in the resilient metal clement, at the engagement points.

* * * * *